(12) United States Patent
Rosenfeld

(10) Patent No.: US 8,155,802 B1
(45) Date of Patent: Apr. 10, 2012

(54) OPTICAL FLOW NAVIGATION SYSTEM

(75) Inventor: Jerome P. Rosenfeld, Collingswood, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 934 days.

(21) Appl. No.: 12/171,796

(22) Filed: Jul. 11, 2008

(51) Int. Cl.
*G05D 1/08* (2006.01)

(52) U.S. Cl. ............... 701/4; 340/435; 340/436; 701/1; 701/3

(58) Field of Classification Search .............. 701/1, 3, 701/14; 356/139.04, 139.05; 348/148, 169, 348/36; 340/435
See application file for complete search history.

(56) References Cited

U.S. PATENT DOCUMENTS

| 4,213,584 | A | 7/1980 | Tefft et al. | |
|---|---|---|---|---|
| 6,793,173 | B2 | 9/2004 | Salesse-Lavergne | |
| 7,161,616 | B1* | 1/2007 | Okamoto et al. | 348/148 |
| 7,679,497 | B1* | 3/2010 | Arant | 340/435 |
| 7,796,081 | B2* | 9/2010 | Breed | 342/70 |
| 7,965,871 | B2 | 6/2011 | Ihara et al. | 382/107 |
| 2003/0201929 | A1* | 10/2003 | Lutter et al. | 342/52 |
| 2005/0110869 | A1* | 5/2005 | Tillotson | 348/113 |
| 2007/0008091 | A1* | 1/2007 | Takenaga et al. | 340/435 |
| 2009/0299684 | A1* | 12/2009 | Imanishi et al. | 702/150 |
| 2010/0045815 | A1* | 2/2010 | Tsuchiya | 348/222.1 |
| 2010/0274390 | A1* | 10/2010 | Walser et al. | 700/259 |
| 2011/0069148 | A1* | 3/2011 | Jones et al. | 348/36 |

OTHER PUBLICATIONS

Oertel, "Machine Vision-Based Sensing for Helicopter Flight Control," German Aerospace Center, Institute of Flight Mechanics, Lilienthalplatz 7, D-38108 Braunschweig (Federal Republic of Germany), Robotica, vol. 18, pp. 299-303, Cambridge University Press (2000).

Jähne, "Digital Image Processing," 6th Revised and Extended Edition (2005).

* cited by examiner

*Primary Examiner* — John Nguyen
*Assistant Examiner* — Michael Ng
(74) *Attorney, Agent, or Firm* — Howard IP Law Group, PC

(57) ABSTRACT

An optical navigation sensor includes four two-dimensional imagers, each aligned with an x or y axis of an orthogonal xyz coordinate system, and each defining mutually parallel vertical image directions and the same horizontal directions about a yaw axis. Translation or roll, pitch, and yaw cause image flow or movement, which can be determined by cross-correlation of successive images. Translation in the x or y direction is determined by differencing image motion in the horizontal direction, and translation in the z direction is determined by summing the image motion in the vertical direction. Pitch about x and roll about y are determined by differencing image motion in the vertical direction, and yaw about z is determined by summing the image flow in the horizontal direction.

20 Claims, 5 Drawing Sheets

|  | CAMERA | | | |
|---|---|---|---|---|
|  | 1 | 2 | 3 | 4 |
| x TRANSLATION | +H | -H | 0 | 0 |
| y TRANSLATION | 0 | 0 | -H | +H |
| z TRANSLATION | -V | -V | -V | -V |
| PITCH (ABOUT x) | +V | -V | 0 | 0 |
| ROLL (ABOUT y) | 0 | 0 | -V | +V |
| YAW (ABOUT z) | +H | +H | +H | +H |

FIG. 3

OPTICAL FLOW NAVIGATION SYSTEM

BACKGROUND OF THE INVENTION

Helicopter control is normally performed by a trained pilot, who operates the "collective," "cyclic," throttle and other flight controls to cause the helicopter to adopt particular attitude(s), and to cause the helicopter to fly in a particular direction, or to maintain a position and altitude (hover). It is not enough for a hovering control system to simply maintain the helicopter at a particular location, but it is also necessary to have a controlled attitude at that particular location. Otherwise, the helicopter might adopt an undesirable attitude, such as inverted. In order to hover at a particular location, an automatic system must link the helicopter flight controls with a sensor system which determines the location and attitude, and with a processor which determines the deviation of location and attitude from the desired location and attitude. Normally, such systems are degenerative feedback systems of some sort. U.S. Pat. No. 4,213,584, issued Jul. 22, 1980 in the name of Tefft et al. describes such a system using longitudinal and lateral accelerometers, together with a vertical gyro, for state sensing. Another such automatic control is described in U.S. Pat. No. 6,793,173, issued Sep. 24, 2004 in the name of Salesse-Layergne. FIG. 1 is a representation of the overall system of Salesse-Layergen. In FIG. 1, a helicopter system designated generally as 9 includes the helicopter 10 itself, and various system elements mounted on the helicopter 10. In FIG. 1, a sensor suite is illustrated as a block 12. The sensor suite 12v determines the various state parameters of the vehicle. A block 13 represents adjustment means or controls by which the pilot can select desired states. A set of actuators 14 which interact with the control axes of the helicopter 10 under the influence of commands from an automatic control device 16. The control device 16 receives sensor states and compares the sensor states with the desired settings of state, and issues such commands to the actuator 14 to cause the states of the helicopter 10 to tend toward the desired values.

Any helicopter automatic flight control system requires sensors responding to six degrees of freedom in order to operate. These six degrees of freedom are the position or location in three mutually orthogonal coordinates, together with roll, pitch, and yaw.

Improved or alternative sensors for three- or six-degree of freedom state determination are desired.

SUMMARY OF THE INVENTION

A method according to an aspect of the invention is for determining the state of a vehicle in terms of location and attitude relative to an external coordinate system defining first, second, and third mutually orthogonal coordinate axes. The method comprises the steps of providing first and second two-dimensional imagers having their fields of view (a) mutually aligned with the first external coordinate axis, and (b) oppositely directed relative to the first external coordinate axis.

The first and second imagers each define a positive first imager direction parallel with the third external coordinate axis, and a positive second imager direction mutually pointing in the same direction about the third coordinate axis. The method also comprises the step of providing third and fourth two-dimensional imagers having their fields of view (a) mutually aligned with the second external coordinate axis, and (b) oppositely directed relative to the second external coordinate axis. The third and fourth imagers each define a positive first imager direction parallel with the third external coordinate axis. The third and fourth imagers each define a positive second imager direction mutually pointing in the same direction about the third coordinate axis. The first, second, third and fourth imaging devices are operated during operation or flight of the vehicle, to thereby produce a time sequence of images from the first, second, third and fourth imagers. For each imager direction of each of the first, second, third and fourth imaging devices, a time-sequence of the images is correlated to thereby generate average angular change of features in the images for each of the first and second imager directions. The angular change of the first imaging device in the second imager direction is or are summed with the angular change of the second imaging device in the second imager direction to thereby determine angular change along the second coordinate axis of the coordinate system. The angular change of the third imaging device in the second imager direction is summed with the angular change of the fourth imaging device in the second imager direction to thereby determine angular change along the first coordinate axis of the coordinate system. The angular changes of the first, second, third and fourth imaging devices are summed in the first imager direction, to thereby determine angular change along the third coordinate axis of the coordinate system. The angular change of the first imaging device in the first imager direction is summed with the angular change of the second imaging device in the first imager direction to thereby determine pitch change about the second coordinate axis. The angular change of the third imaging device in the first imager direction is summed with the angular change of the fourth imaging device in the first imager direction to thereby determine roll change about the first coordinate axis. The angular changes of the first, second, third, and fourth imaging devices in the second imager direction are summed to thereby determine yaw change about the third coordinate direction.

In a particular mode of the method, wherein the steps of (a) summing to thereby determine angular change along the second coordinate axis of the coordinate system and (b) summing to thereby determine angular change along the first coordinate axis of the coordinate system each include the step of taking a difference.

A method according to another aspect of the invention is for controlling the state of a vehicle in terms of location and attitude relative to a coordinate system defining first, second, and third mutually orthogonal coordinate axes. The method comprises the step of providing a vehicle body including propulsion system actuators and an automatic control device for receiving changes in the position and attitude of the vehicle body. First and second two-dimensional imagers are provided. The first and second imagers have their fields of view (a) mutually aligned with the first external coordinate axis, and (b) oppositely directed relative to the first external coordinate axis. The first and second imagers each define a positive first imager direction parallel with the third external coordinate axis, and a positive second imager direction mutually pointing in the same direction about the third coordinate axis. Third and fourth two-dimensional imagers are provided. Each of the third and fourth imagers has its field of view (a) mutually aligned with the second external coordinate axis, and (b) oppositely directed relative to the second external coordinate axis. The third and fourth imagers each defines a positive first imager direction parallel with the third external coordinate axis, and a positive second imager direction mutually pointing in the same direction about the third coordinate axis. The first, second, third and fourth imaging devices are operated during flight of the vehicle, to thereby produce a time sequence of images from the first, second, third and fourth imagers. For each imager direction of each of the first, second, third and fourth imaging devices, a time-sequence of the images is correlated to thereby generate average angular change of features in the images for each of the first and second imager directions. The angular change of the first imaging device in the second imager direction is summed with the angular change of the second imaging device in the second imager direction to thereby determine angular change along the second coordinate axis of the coordinate system. The angular change of the third imaging device in the second imager direction is summed with the angular change of the fourth imaging device in the second imager direction to thereby determine angular change along the first coordinate axis of the coordinate system. The angular changes of the first, second, third and fourth imaging devices are summed in the first imager direction, to thereby determine or establish the angular change along the third coordinate axis of the coordinate system. The angular change of the first imaging device in the first imager direction is summed with the angular change of the second imaging device in the first imager direction to thereby determine pitch change about the second coordinate axis. The angular change of the third imaging device in the first imager direction is summed with the angular change of the fourth imaging device in the first imager direction to thereby determine roll change about the first coordinate axis. The angular change of the first, second, third, and fourth imaging devices in the second imager direction are summed to thereby determine yaw change about the third coordinate direction. The angular change along the second coordinate axis of the coordinate system, angular change along the first coordinate axis of the coordinate system; angular change along the third coordinate axis of the coordinate system, pitch change about the second coordinate axis, roll change about the first coordinate axis, and yaw change about the third coordinate direction are coupled to the automatic control device. The automatic control device is operated to maintain a given state of the vehicle.

BRIEF DESCRIPTION OF THE DRAWING

FIG. 3 tabulates the coefficients with which the various correlated signals are summed.

DESCRIPTION OF THE INVENTION

Figure 2A:
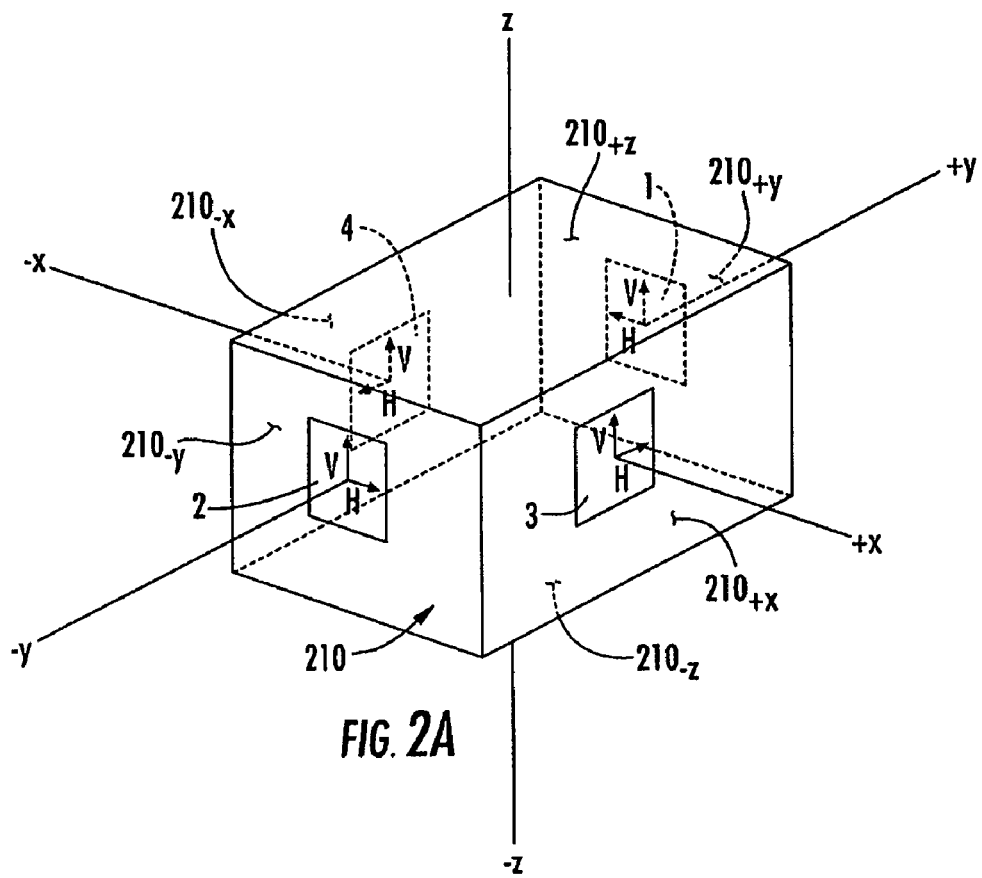
FIG. 2A is a simplified perspective or isometric notional view of a vehicle located in an external x,y,z coordinate system, showing the locations of two-dimensional imager planes according to an aspect of the invention, and defining certain imager directions.

In FIG. 2A, the vehicle body is represented by a rectangular parallelepiped or box 210 centered on the x, y, and z axes. As illustrated, the +x axis intersects a face $210_{+x}$ of body 210, and the −x axis intersects a face $210_{-x}$. Similarly, the +y and −y axes intersect faces $210_{+y}$ and $210_{-y}$ faces, respectively, and the +z and −z axes intersect the $210_{+z}$ and $210_{-z}$ axes, respectively. Four camera or imager locations are also illustrated in FIG. 2A. A first camera, designated as 1, is mounted on face $210_{+y}$ and has its field of view centered on, or at least parallel with, the +y axis. The representation of camera 1 illustrates its focal plane as a rectangle, and for simplicity of explanation ignores the effects of imaging lenses. Those skilled in the art know that the effects of lenses may be to invert the images arriving at the focal plane, and they also know how to compensate for the presence of lenses. Camera 1 is illustrated as having a "vertical" image plane direction V which is parallel with the +z direction, and is illustrated as having a "horizontal" direction H. Similarly, a second two-dimensional imager or camera 2 is illustrated as being centered on the −y axis, with its field of view directed along, or at least parallel with, the −y axis. Thus, the fields of view of cameras 1 and 2 are oppositely directed and parallel with the ±y axes. Camera 2 also defines a vertical V image plane direction parallel with the +z axis, and a horizontal H direction.

FIG. 2A also illustrates a second pair of cameras or camera focal planes 3 and 4 mounted on faces $210_{+x}$ and $210_{-x}$, respectively, and having their fields of view directed along, or at least parallel with, the +x and −x axes, respectively. Cameras 3 and 4 each define a vertical V image plane direction parallel with the +z direction, and also define horizontal H image plane directions. Cameras 3 and 4 are mutually oppositely directed along the x direction.

Figure 2B:
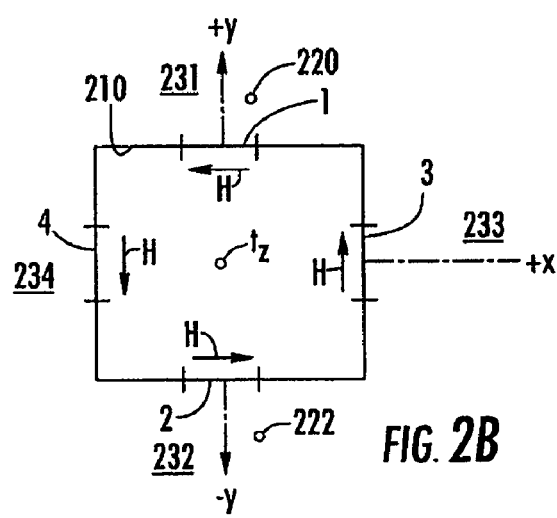
FIG. 2B is a cross-sectional view of the arrangement of FIG. 2A looking along the z axis.

In FIG. 2B, the structure of FIG. 2A is viewed along the +z axis. In this view, the four imagers 1, 2, 3, and 4 are seen in the same xy plane. The horizontal H directions of imagers 1, 2, 3, and 4 can be seen to be directed in the same counterclockwise direction about the +z axis.

In operation, the imagers 1, 2, 3, and 4 of FIGS. 2A and 2B produce field- or frame-rate images of the external environment. The processing of the images from the various imagers is simplified if the field or frame rates of the imagers are equal. The first step in processing the imager information is to correlate two or more successive frames of each imager. Thus, successive frames over a period of time from imager 1 are cross-correlated in a first imager direction, successive frames over the same period of time from imager 2 in the first imager direction are cross-correlated, successive frames over the same period of time from imager 3 in the first imager direction are cross-correlated, and successive frames over the same period of time from imager 4 in the first imager direction are cross-correlated. Also, successive frames over a period of time from imager 1 are cross-correlated in the second or other imager direction, successive frames over the same period of time from imager 2 in the second imager direction are cross-correlated, successive frames over the same period of time from imager 3 in the second imager direction are cross-correlated, and successive frames over the same period of time from imager 4 in the second imager direction are cross-correlated. It is expected that, even in the absence, of any discrete object or target in the field of view, there will be enough structure in the images of a scene so that cross-correlation will produce signals. Thus, in general, it is not necessary that any specific object be found in the image plane. The cross-correlation signals will show a frame-to-frame image movement or "flow" in the presence of translation (movement in the x, y, or z direction) of the body 210. Certain changes also occur in the images as a function of pitch, roll or yaw of the body 210. Such directional cross-correlation is so well known in the art that it is found in basic texts. Pages 45-46 of the text Digital Image Processing, $6^{th}$ Edition, by Bernd Jähne, published 2006 by Springer define the one-dimensional cross-correlation function. Page 100 defines the image cross-correlation function.

In FIG. 2A, assume for a moment that a pair of objects 220, 222 are within the fields of view 231, 232 of imagers or cameras 1 and 2, respectively, and also assume for simplicity that the images of the objects are simply projected onto the image planes of cameras 1 and 2. With these assumptions, translation of body 210 in the +x direction will cause object 220, as projected onto the image plane of camera 1, to move in the +H direction. Similarly, translation of body 210 in the +x direction will cause object 222, as projected onto the image plane of camera 2, to move in the −H direction. The objects 220 and 222 are not necessary if there is sufficient other structure within the fields of view of cameras 1 and 2 to allow the relative flow to be observed. Imagers 3 and 4 similarly have fields of view that subtend regions designated 233 and 234, respectively. In a similar manner, translation of body 210 of FIG. 2B in the +y direction will cause flow of structure in the −H direction of camera 3 and in the +H direction of camera 4 to be identifiable.

Yet further, translation of body 210 of FIG. 2A in the +z direction will result in flow in the structure viewed by imagers 1, 2, 3, and 4 in the −V direction, and translation of body 210 in the −z direction will result in flow of the structure in the +V direction.

Assuming that pitch in the arrangement of FIG. 2A is represented by rotation about the x axis, such a rotation will result in image structure flow parallel with the V directions of imagers 1 and 2. More particularly if face $210_{+y}$ of FIG. 2A nods downward relative to the +y axis, and face $210$-$y$ correspondingly nods upward, the flow in camera 1 will be in the −V direction, and the flow in camera 2 will be in the +V direction. The other direction of pitch will in the same manner cause flow in the +V direction in camera 1 and in the −V direction in camera 2.

Assuming that roll in the arrangement of FIG. 2A is represented by rotation about the y axis, such a rotation will result in image structure flow parallel with the V directions of imagers 3 and 4. More particularly if face $210_{+x}$ of FIG. 2A nods downward relative to the +x axis, and face $210$-$x$ correspondingly nods upward, the flow in camera 3 will be in the −V direction, and the flow in camera 4 will be in the +V direction. The other direction of roll will in the same manner cause flow in the +V direction in camera 3 and in the −V direction in camera 4.

Assuming that yaw in the arrangement of FIG. 2B is represented by rotation about the z axis, such a rotation will result in image structure flow parallel with the H directions of imagers 1, 2, 3 and 4. More particularly if body 210 of FIG. 2B rotates clockwise about the +z axis, the flow in cameras 1, 2, 3 and 4 will be in the −H direction. The other direction of yaw (CCW in FIG. 2B) will in the same manner cause flow in the −H direction.

Figure 2C:
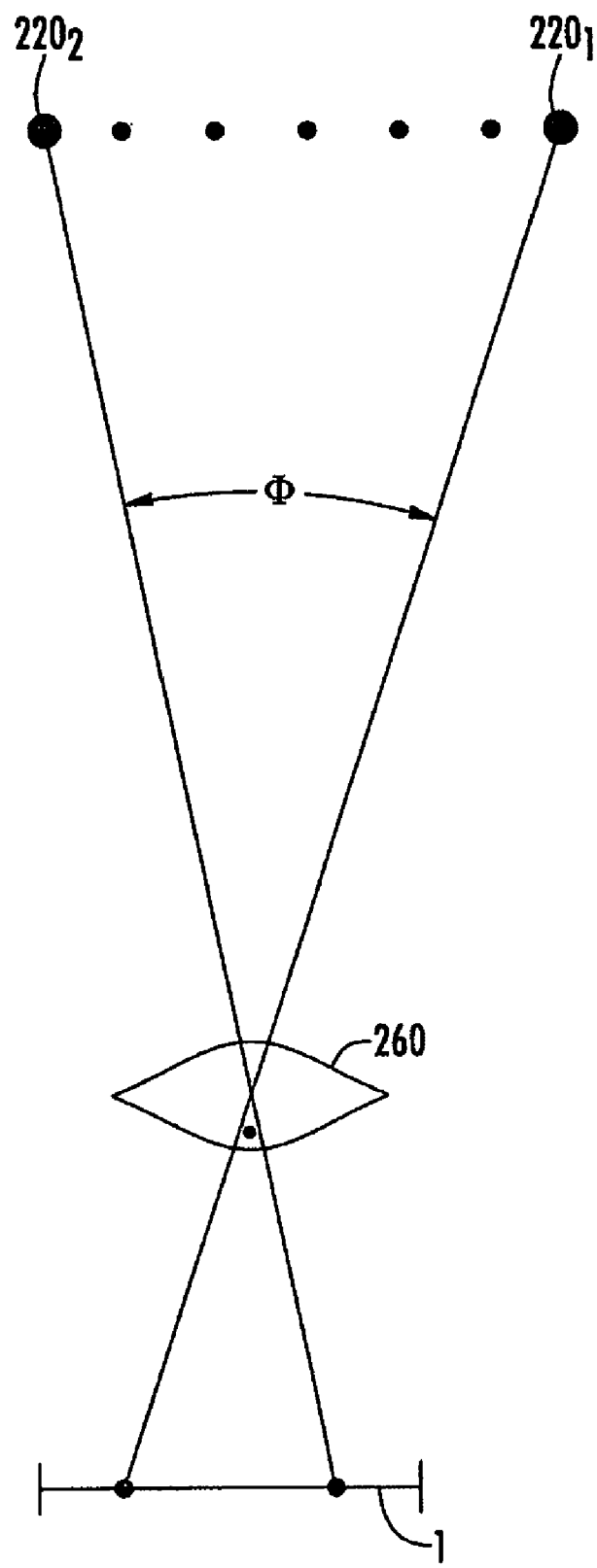
FIG. 2C is a representation of an imager plane with a lens.

The representations of simple projection of the external objects onto the image plane of the imagers, as described in conjunction with FIG. 2B, is suitable for simplified explanation, but leads to description of the apparent image motion as "flow rate," which may be confusing. FIG. 2C illustrates a view of the image plane of imager 1 of FIG. 2B with the addition of a lens for imaging the outside world onto the image plane. The effect of rotation of the body 210 about the z axis under yaw conditions results in apparent movement of the image of object 220 from position $220_1$ to position $220_2$, with concomitant movement of the image. FIG. 2C makes it clear that rotation of the body 210 results in apparent angular motion. Thus, the "flow" of the image resulting from roll, pitch, and yaw may be termed "angular flow" or "angular change."

The cross-correlation processing of the successive image frames or fields produced by the imagers is simple and well known. Once the various correlated images and their flows are established, it is a simple matter to determine the translation in x, y, and z directions, and the attitude in terms of pitch, roll, and yaw. This is accomplished by summing the flows in various imager directions of various ones of the imagers, as detailed in the table of FIG. 3. In the table of FIG. 3, x translation of the body is determined by summing the H-direction information from cameras 1 and 2, with an inversion of the camera 2 information. That is, the H-direction flow information from camera 1 is summed with the inverse of the H-direction information from camera 2, thus +H1 −H2. Those skilled in the art will understand that the summations and associated inversions will depend upon the definitions of the positive directions of translation and of imager V and H directions, so that the indicated inversions and summations are true for only one set of designations or assumptions. Those skilled in the art will be able to construe the teachings in dependence upon the assumptions and designations.

In the table of FIG. 3, y translation of the body is determined by summing the flows in the H directions of imagers 3 and 4, with an inversion of the camera 3 H-direction flow information; thus −H3+H4. Translation of the body 210 in the z direction is determined by summing the V-direction flow information with all inputs inverted, thus −V1 −V2 −V3 −V4.

In the table of FIG. 3, pitch about the x axis is determined by summing the flow in the V direction of imager 1 with the inverse of the flow in the V direction of imager 2; thus V1−V2. Similarly, roll about the y axis is determined by summing the flow in the V direction of imager 4 with the inverse of the flow of imager 3; thus V4−V3. Yaw about the z axis is determined by summing the H-direction flow of imagers 1, 2, 3, and 4; thus H1+H2+H3+H4.

While an arrangement has been described using four two-dimensional imagers for determining six degrees of freedom of a movable body, it will be clear that a subset can be used to determine a subset of the information. Thus, a set of imagers responsive only to H flow can be used to determine x translation, y translation, and yaw. Similarly, a set of imagers responsive only to V flow information can be used to determine z translation, pitch and roll.

Figure 4:
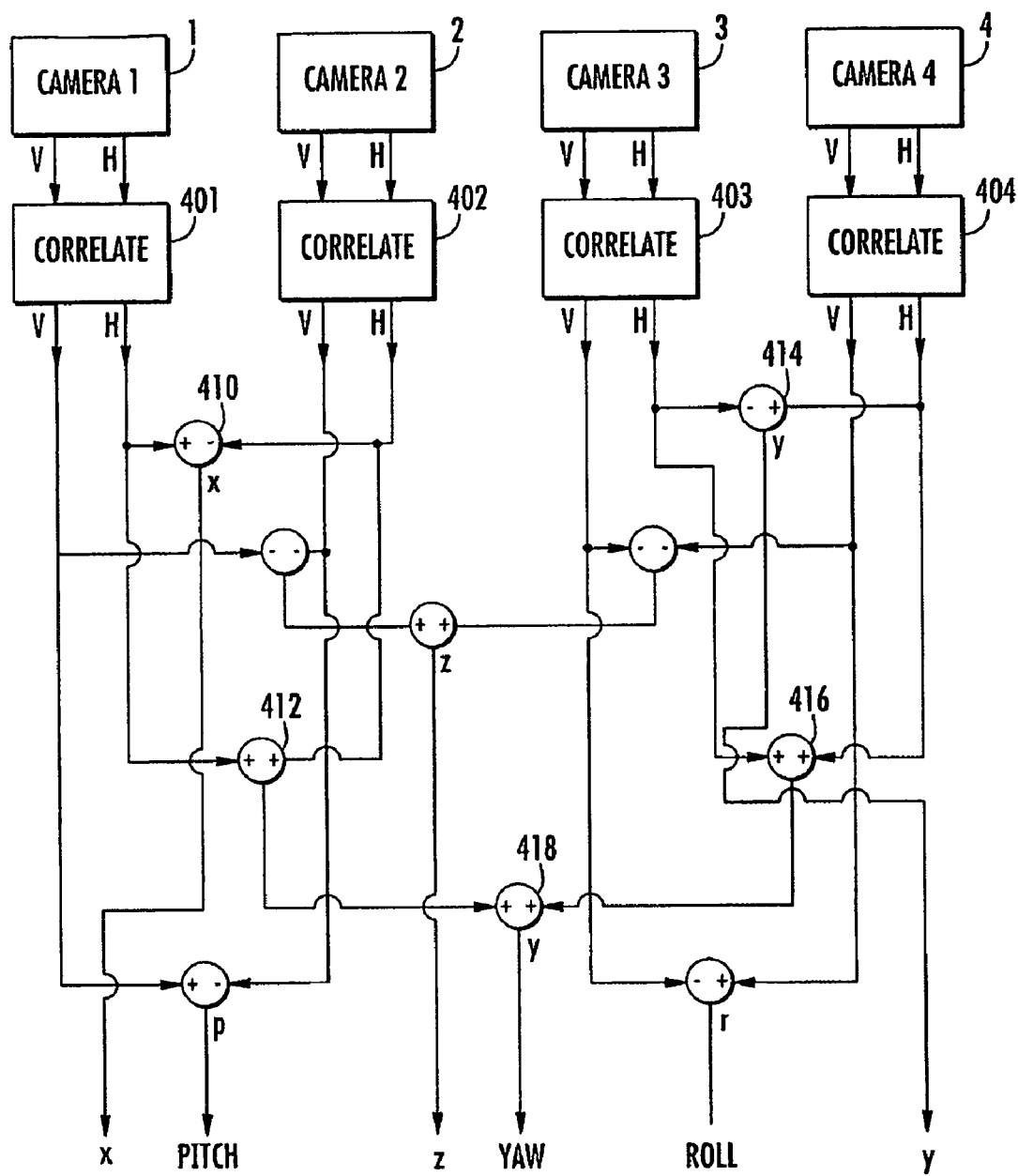
FIG. 4 is a simplified block diagram of a state sensing system according to an aspect of the invention.

FIG. 4 is a simplified overall representation of one mode or embodiment of a state determining arrangement according to one aspect of the invention. In FIG. 4, the V and H outputs of imager 1 are coupled to a time correlation function illustrated as 401, the V and H outputs of imager 2 are coupled to a time correlation function illustrated as 402, the V and H outputs of imager 3 are coupled to a time correlation function illustrated as 403, and the V and H outputs of imager 4 are coupled to a time correlation function illustrated as 403. The correlations in the V and H directions are performed independently. The H correlation output of correlator 401 is applied to the noninverting (+) input ports of summing circuits 410 and 412. The H correlation output of correlator 402 is coupled to inverting (−) input port of summing circuit 410, and to the noninverting input port of summing circuit 412. The summed output of summing circuit 410 represents the x-direction translation. The H correlation output of correlator 403 is applied to the inverting input port of a summing circuit 414 and to a noninverting input port of a summing circuit 416. The H correlation output of correlator 404 is applied to a noninverting input port of summing circuit 414 and to a noninverting input port of a summing circuit 416. The summed output of summing circuit 414 represents the y-direction translation. The summed outputs of summing circuits 412 and 416 are summed in a summing circuit 418, the output of which represents yaw.

Figure 1:
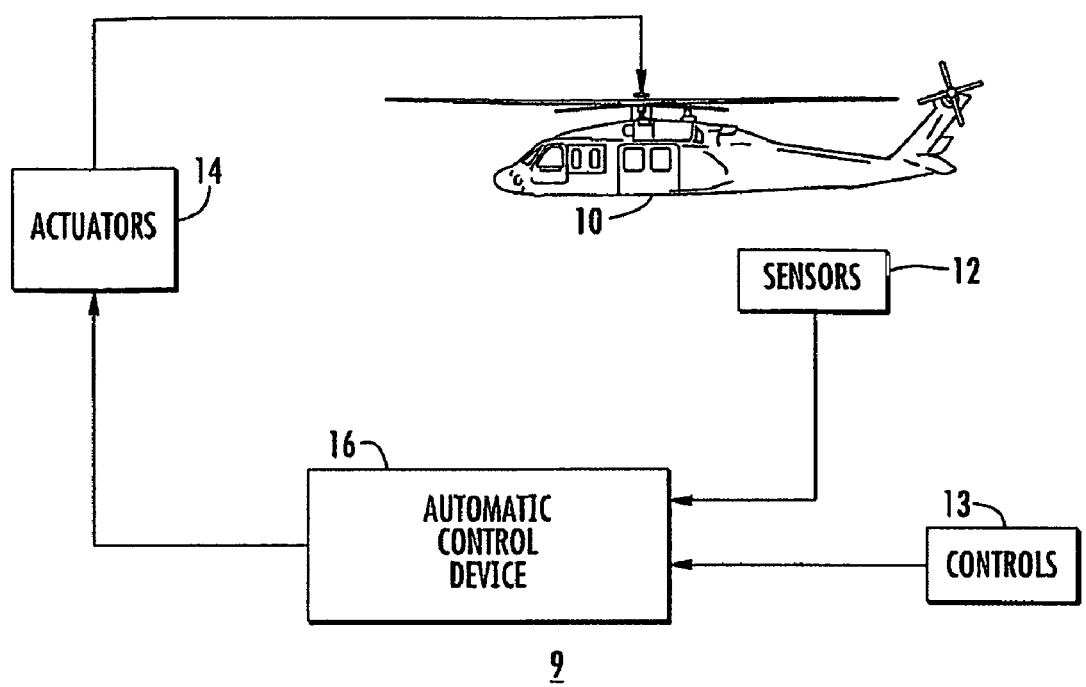
FIG. 1 is a representation of a prior-art flight control system 1 as described in U.S. Pat. No. 6,793,173.

The arrangement of FIG. 4 may be used anywhere that the six-degree-of-freedom state of a vehicle is desired. That is to say that the arrangement of FIG. 4, or any other arrangement according to an aspect of the invention, may be used in place of sensor block 12 of FIG. 1.

Those skilled in the art will recognize that the spectrum of radiation to which the imagers should be responsive will depend upon the environment. While visible-light imagers may be used, infrared and ultraviolet responses may be appropriate. More generally, any spectral bandwidth may be used, as desired. Also, the imager may be line-scanned or staring, or use any other operating mode.

A method according to an aspect of the invention is for determining the state of a vehicle (10) in terms of location and attitude relative to an external coordinate system defining first (y), second (x), and third (z) mutually orthogonal coordinate axes. The method comprises the steps of providing first (1) and second (2) two-dimensional imagers having their fields of view (231, 232) (a) mutually aligned with the first external coordinate axis (y), and (b) oppositely directed relative to the first external coordinate axis (y). The first (1) and second (2) imagers each define a positive first imager direction (V) parallel with the third external coordinate axis (z), and a positive second imager direction (H) mutually pointing in the same direction about the third coordinate axis (z). The method also comprises the step of providing third (3) and fourth (4) two-dimensional imagers having their fields of view (233, 234) (a) mutually aligned with the second external coordinate axis (x), and (b) oppositely directed (+x, −x) relative to the second external coordinate axis (x). The third (3) and fourth (4) imagers each define a positive first imager direction (+V) parallel with the third external coordinate axis (z). The third (3) and fourth (4) imagers each define a positive second imager direction (+H) mutually pointing in the same direction about the third coordinate axis (z). The first (1), second (2), third (3) and fourth (4) imaging devices are operated during operation or flight of the vehicle (10), to thereby produce a time sequence of images from the first (1), second (2), third (3) and fourth (4) imagers. For each imager direction (V,H) of each of the first (1), second (2), third (3) and fourth (4) imaging devices, a time-sequence of the images is correlated to thereby generate average angular change of features in the images for each of the first (V) and second (H) imager directions. The angular change of the first imaging device (1) in the second imager direction (H) is or are summed with the angular change of the second imaging device (2) in the second imager direction (H) to thereby determine angular change along the second coordinate axis (x) of the coordinate system. The angular change of the third imaging device (3) in the second imager (H) direction is summed with the angular change of the fourth imaging device (4) in the second imager direction (H) to thereby determine angular change along the first coordinate axis (y) of the coordinate system. The angular changes of the first (1), second (3), third (2) and fourth (4) imaging devices are summed in the first imager direction (V), to thereby determine angular change along the third coordinate axis (z) of the coordinate system. The angular change of the first imaging device (1) in the first imager direction (V) is summed with the angular change of the second imaging device (2) in the first imager direction (V) to thereby determine pitch change about the second coordinate axis (x). The angular change of the third imaging device (3) in the first imager direction (V) is summed with the angular change of the fourth imaging device (4) in the first imager direction (V) to thereby determine roll change about the first coordinate axis (y). The angular changes of the first (1), second (3), third (2), and fourth (4) imaging devices in the second imager direction (h) are summed to thereby determine yaw change about the third coordinate direction (z).

In a particular mode of the method, wherein the steps of (a) summing to thereby determine angular change along the second coordinate axis (x) of the coordinate system and (b) summing to thereby determine angular change along the first coordinate axis (y) of the coordinate system each include the step of taking a difference.

A method according to another aspect of the invention is for controlling the state of a vehicle in terms of location and attitude relative to an (x, y, z) coordinate system defining first (y), second (x), and third (z) mutually orthogonal coordinate axes. The method comprises the step of providing a vehicle body (10) including propulsion system actuators (14) and an automatic control device (16) for receiving changes in the position and attitude of the vehicle body. First (1) and second (2) two-dimensional imagers are provided. The first (1) and second (2) imagers have their fields of view (a) mutually aligned with the first external coordinate axis (y), and (b) oppositely directed (+y, −y) relative to the first external coordinate axis (y). The first (1) and second (2) imagers each define a positive first imager direction (+v) parallel with the third external coordinate axis (z), and a positive second imager direction (+h) mutually pointing in the same direction about the third coordinate axis (z). Third (3) and fourth (4) two-dimensional imagers are provided. Each of the third (3) and fourth (4) imagers has its field of view (a) mutually aligned with the second external coordinate axis (x), and (b) oppositely directed (+x, −x) relative to the second external coordinate axis (x). The third (3) and fourth (4) imagers each defines a positive first imager direction (+v) parallel with the third external coordinate axis (z), and a positive second imager direction (+h) mutually pointing in the same direction about the third coordinate axis (z). The first, second, third and fourth imaging devices are operated during flight of the vehicle, to thereby produce a time sequence of images from the first, second, third and fourth imagers. For each imager direction (v, h) of each of the first (1), second (2), third (3) and fourth (4) imaging devices, a time-sequence of the images is correlated to thereby generate average angular change of features in the images for each of the first (v) and second (h) imager directions. The angular change of the first imaging device (1) in the second imager direction (h) is summed with the angular change of the second imaging device (2) in the second imager direction (h) to thereby determine angular change along the second coordinate axis (x) of the coordinate system. The angular change of the third imaging device (3) in the second imager (h) direction is summed with the angular change of the fourth imaging device (4) in the second imager direction (h) to thereby determine angular change along the first coordinate axis (y) of the coordinate system. The angular changes of the first (1), second (3), third (2) and fourth (4) imaging devices are summed in the first imager direction (v), to thereby determine or establish the angular change along the third coordinate axis (z) of the coordinate system. The angular change of the first imaging device (1) in the first imager direction (v) is summed with the angular change of the second imaging device (2) in the first imager direction (v) to thereby determine pitch change about the second coordinate axis (x). The angular change of the third imaging device (3) in the first imager direction (v) is summed with the angular change of the fourth imaging device (4) in the first imager direction (v) to thereby determine roll change about the first coordinate axis (y). The angular change of the first (1), second (3), third (2), and fourth (4) imaging devices in the second imager direction (h) are summed to thereby determine yaw change about the third coordinate direction (z). The angular change along the second coordinate axis (x) of the coordinate system, angular change along the first coordinate axis (y) of the coordinate system; angular change along the third coordinate axis (z) of the coordinate system; pitch change about the second coordinate axis (x); roll change about the first coordinate axis (y);

and yaw change about the third coordinate direction (z) are coupled to the automatic control device (16). The automatic control device is operated to maintain a given state.

What is claimed is:

1. A method for determining the state of a vehicle in terms of location and attitude relative to an external coordinate system defining first, second, and third mutually orthogonal coordinate axes, said method comprising the steps of:

providing first and second two-dimensional imagers having their field of view (a) mutually aligned with said first external coordinate axis, and (b) oppositely directed relative to said first external coordinate axis, said first and second imagers each defining a positive first imager direction parallel with said third external coordinate axis, and a positive second imager direction mutually pointing in the same direction about said third coordinate axis;

providing third and fourth two-dimensional imagers having their fields of view (a) mutually aligned with said second external coordinate axis, and (b) oppositely directed relative to said second external coordinate axis, said third and fourth imagers each defining a positive first imager direction parallel with said third external coordinate axis, and a positive second imager direction mutually pointing in the same direction about said third coordinate axis;

operating said first, second, third and fourth imagers during flight of said vehicle, to thereby produce a time sequence of images from said first, second, third and fourth imagers;

for each imager direction of each or said first, second, third and fourth imagers, cross-correlating a time-sequence of the images to thereby generate average angular change of features in the images for each of said first and second imager directions;

summing the angular change of said first imager in said second imager direction with the angular change of said second imager in said second imager direction to thereby determine angular change relative to a point on said second coordinate axis of said coordinate system;

summing the angular change of said third imager in said second imager direction with the angular change of said fourth imager in said second imager direction to thereby determine angular change relative to a point on said first coordinate axis of said coordinate system;

summing the angular changes of said first, second, third and fourth imagers in said first imager direction, to thereby determine angular change along relative to a point on said third coordinate axis of said coordinate system;

summing said angular change of said first imager in said first imager direction with said angular change of said second imager in said first imager direction to thereby determine pitch change about said second coordinate axis;

summing said angular change of said third imager in said first imager direction with said angular change of said fourth imager in said first imager direction to thereby determine roll change about a first coordinate axis; and summing said angular change of said first, second, third and fourth imagers in said second imager direction to thereby determine yaw change about said third coordinate axis; and operating an automatic control device using at least one of said angular change, said pitch change, said roll change and said yaw change, to maintain a desired state of said vehicle.

2. A method according to claim 1, wherein, in said steps of (a) summing to thereby determine angular change relative to a point on said second coordinate axis of said coordinate system and (b) summing to thereby determine angular change relative to a point on said first coordinate axis of said coordinate system each include the step of taking a difference.

3. A method according to claim 1, wherein said step of (a) summing said angular change to thereby determine pitch change and (b) summing said angular change to thereby determine roll change each include a subtraction.

4. A method for controlling the state of a vehicle in terms of location and attitude relative to a coordinate system defining first, second and third mutually orthogonal coordinate axes, said method comprising the steps of:

providing a vehicle body including propulsion system actuators and an automatic control device for receiving changes in the position and attitude of the vehicle body;

providing first and second two-dimensional imagers having their fields of view (a) mutually aligned with said first external coordinate axis, and (b) oppositely directed relative to said first external coordinate axis, said first and second imagers each defining a positive first imager direction parallel with said third external coordinate axis, and a positive second imager direction mutually pointing in the same direction about said third coordinate axis;

providing third and fourth two-dimensional imagers having their fields of view (a) mutually aligned with said second external coordinate axis, and (b) oppositely directed relative to said second external coordinate axis, said third and fourth imagers each defining a positive first imager direction parallel with said third external coordinate axis, and a positive second imager direction mutually pointing in the same direction about said third coordinate axis;

operating said first, second, third and fourth imagers during flight of said vehicle, to thereby produce a time sequence of images from said first, second, third and fourth imagers;

for each imager direction of each of said first, second, third and fourth imagers, correlating a time-sequence of the images to thereby generate average angular change of features in the images for each of said first and second imager directions;

summing the angular change of said first imager in said second imager direction with the angular change of said second imager in said second imager direction to thereby determine angular change relative to a point on said second coordinate axis of said coordinate system;

summing the angular change of said third imager in said second imager direction with the angular change of said fourth imager in said second imager direction to thereby determine angular change relative to a point on said first coordinate axis of said coordinate system;

summing the angular changes of said first, second, third and fourth imagers in said first imager direction, to thereby determine angular change relative to a point on a said third coordinate axis of said coordinate system;

summing said angular change of said first imager in said first imager direction with said angular change of said second imager is said first imager direction to thereby determine pitch change about said second coordinate axis;

summing said angular change of said third imager in said first imager direction with said angular change of said fourth imager in said first imager direction to thereby determine roll change about said first coordinate axis; and summing said angular change of said first, second, third and fourth imagers in said second imager direction to thereby determine yaw change about said third coordinate axis; and coupling to said automatic control device said angular change along said second coordinate axis of said coordinate system, angular change along said first coordinate axis of said coordinate system; angular change along said third coordinate axis of said coordinate system; pitch change about said second coordinate axis; roll change about said first coordinate axis; and yaw change about said third coordinate axis; and operating said automatic control device to maintain a given state.

5. A method for determining the state of a vehicle, said method comprising the steps of:

defining a coordinate system having mutually orthogonal first, a second and a third coordinate axes;

providing first, second, third and fourth imagers, each of said imagers having a view of view aligned relative to a corresponding coordinate axis;

operating said first, second, third and fourth imagers during flight of said vehicle to produce a time sequence of images from said first, second, third and fourth imagers;

for each of said first, second, third and fourth imagers, cross-correlating the time-sequence of the images to generate an angular change of features in images;

summing said angular change of said first imager in one of said imager directions with said angular change of said second imager in said one of said imager directions to determine angular change relative to a point on said first coordinate axis of said coordinate system;

summing an angular change of said third imager in said one of said imager directions with an angular change of said fourth imager in said one of said imager directions to determine angular change relative to a point on said second coordinate axis of said coordinate system;

summing said angular changes of said first, second, third and fourth imagers in another of said imager directions, to determine an angular change relative to a point on said third coordinate axis of said coordinate system;

summing said angular change of said first imager in said another imager direction with said angular change of said second imager in said another imager direction to determine a pitch change about said second coordinate axis;

summing said angular change of said third imager in said one of said imager directions with said angular change of said fourth imager in said one of said imager directions to thereby determine roll change about said first coordinate axis;

summing said angular change of said first, second, third and fourth imagers in said another imager direction to determine yaw change about a third coordinate axis; and operating an automatic control device using at least one of said angular change, said pitch change, said roll change and said yaw change to control propulsion system actuators associated with said vehicle.

6. A method for determining the state of a vehicle according to claim 5, wherein the coordinate system has an x-axis, a y-axis, and a z-axis, wherein the first coordinate axis is parallel with the x-axis, the second coordinate axis is parallel with the y-axis, and the third coordinate axis is parallel with the z-axis;

wherein each of the first, second, third and fourth imagers has an image plane, each of the image planes comprising a vertical image plane direction (V-direction) and a horizontal image plane direction (H-direction);

wherein the V-directions of the first, second, third and fourth imagers are oriented in the +z-axis direction; and wherein the H-direction of the first imager is oriented in the −x-axis direction, the H-direction of the second imager is oriented in the +x-axis direction, the H-direction of the third imager is oriented in the +y-axis direction, and the H-direction of the fourth imager is oriented in the −y-axis direction.

7. A method for determining the state of a vehicle according to claim 6, wherein the step of summing an angular change of said first imagers in one of said imager directions with an angular change of said second imager in another of said imager directions comprises summing the H-direction angular change from the first imager with an inverse of the H-direction angular change from the second imager.

8. A method for determining the state of a vehicle according to claim 6, wherein the step of summing an angular change of said third imager in said one of said imager directions with an angular change of said fourth imager in said one of said imager directions comprises summing the H-direction angular change from the third imager with an inverse of the H-direction angular change from the fourth imager.

9. A method for determining the state of a vehicle according to claim 6, wherein the step of summing said angular changes of said first, second, third and fourth imagers in another of said imager directions comprises summing the inverses of the V-direction angular changes from the first, second, third and fourth imagers.

10. A method for determining the state of a vehicle according to claim 6, wherein the step of summing said angular change of said first imager in said another imager direction with said angular change of said second imager in said another imager direction comprises summing the V-direction angular change from the first imager with an inverse of the V-direction angular change from the second imager.

11. A method for determining the state of a vehicle according to claim 6, wherein the step of summing said angular change of said third imager in said one of said imager directions with said angular change of said fourth imager in said one of said imager directions comprises summing the V-direction angular change from the fourth imager with an inverse of the V-direction angular change from the third imager.

12. A method for determining the state of a vehicle according to claim 6, wherein the step of summing the angular change of said first, second, third and fourth imagers in said another imager direction comprises summing the H-direction angular changes from the first, second, third and fourth imagers.

13. A system for determining the state of a vehicle, said system comprising first, second, third and fourth imagers, each of said imagers having a field of view, and each of said imagers having an imager direction;

a processor executing instructions for performing the steps of:

operating said first, second, third and fourth imagers during flight of said vehicle to produce a time sequence of images from said first, second, third and fourth imagers;

for each imager direction of each of said first, second, third and fourth imagers, cross-correlating the time-sequence of the images to generate an angular change of features in images;

defining a coordinate system having mutually orthogonal first, a second and a third axes;

summing said angular change of said first imager in one of said imager directions with said angular change of said second imager in said one of said imager directions to determine angular change relative to a point on said first coordinate axis of said coordinate system;

summing an angular change of said third imager in said one of said imager directions with an angular change of said fourth imager in said one of said imager directions to determine angular change relative to a point on said second coordinate axis of said coordinate system;

summing said angular changes of said first, second, third and fourth imagers in another of said imager directions, to determine an angular change relative to a point on said third coordinate axis of said coordinate system;

summing said angular change of said first imager in said another imager direction with said angular change of said second imager in said another imager direction to determine a pitch change about said second coordinate axis;

summing said angular change of said third imager in said one of said imager directions with said angular change of said fourth imager in said one of said imager directions to thereby determine roll change about said first coordinate axis;

summing said angular change of said first, second, third and fourth imagers in said another imager direction to determine yaw change about a third coordinate axis; and operating an automatic control device using at least one of said angular change, said pitch change, said roll change and said yaw change to control propulsion system actuators associated with said vehicle.

14. A system for determining the state of a vehicle according to claim 13, wherein the coordinate system has an x-axis, a y-axis and a z-axis, wherein the first coordinate axis is parallel with the x-axis, the second coordinate axis is parallel with the y-axis, and the third coordinate axis is parallel with the z-axis;

wherein each of the first, second, third and fourth imagers has an image plane, each of the image planes comprising a vertical image plane direction (V-direction) and a horizontal image plane direction (H-direction);

wherein the V-directions of the first, second, third and fourth imagers are oriented in the +z-axis direction; and wherein the H-direction of the first imager is oriented in the −x-axis direction, the H-direction of the second imager is oriented in the +x-axis direction, the H-direction of the third imager is oriented in the +y-axis direction, and the H-direction of the fourth imager is oriented in the −y-axis direction.

15. A system for determining the state of a vehicle according to claim 14, wherein the step of summing an angular change of said first imagers in one of said imager directions with an angular change of said second imager in another of said imager directions comprises summing the H-direction angular change from the first imager with an inverse of the H-direction angular change from the second imager.

16. A system for determining the state of a vehicle according to claim 14, wherein the step of summing an angular change of said third imager in said one of said imager directions with an angular change of said fourth imager in said one of said imager directions comprises summing the H-direction angular change from the third imager with an inverse of the H-direction angular change from the fourth imager.

17. A system for determining the state of a vehicle according to claim 14, wherein the step of summing said angular changes of said first, second, third and fourth imagers in another of said imager directions comprises summing the inverses of the V-direction angular changes from the first, second, third and fourth imagers.

18. A system for determining the state of a vehicle according to claim 14, wherein the step of summing said angular change of said first imager in said another imager direction with said angular change of said second imager in said another imager direction comprises summing the V-direction angular change from the first imager with an inverse of the V-direction angular change from the second imager.

19. A system for determining the state of a vehicle according to claim 14, wherein the step of summing said angular change of said third imager in said one of said imager directions with said angular change of said fourth imager in said one of said imager directions comprises summing the V-direction angular change from the fourth imager with an inverse of the V-direction angular change from the third imager.

20. A system for determining the state of a vehicle according to claim 14, wherein the step of summing the angular change of said first, second, third and fourth imagers in said another imager direction comprises summing the H-direction angular changes from the first, second, third and fourth imagers.

\* \* \* \* \*